April 15, 1958 — H. R. BILLETER — 2,830,469
FRICTION DRIVE MEANS
Original Filed Sept. 30, 1952 — 5 Sheets-Sheet 1

INVENTOR.
Henry Robert Billeter,
BY Fidler, Crowe & Beardsley
Atty's.

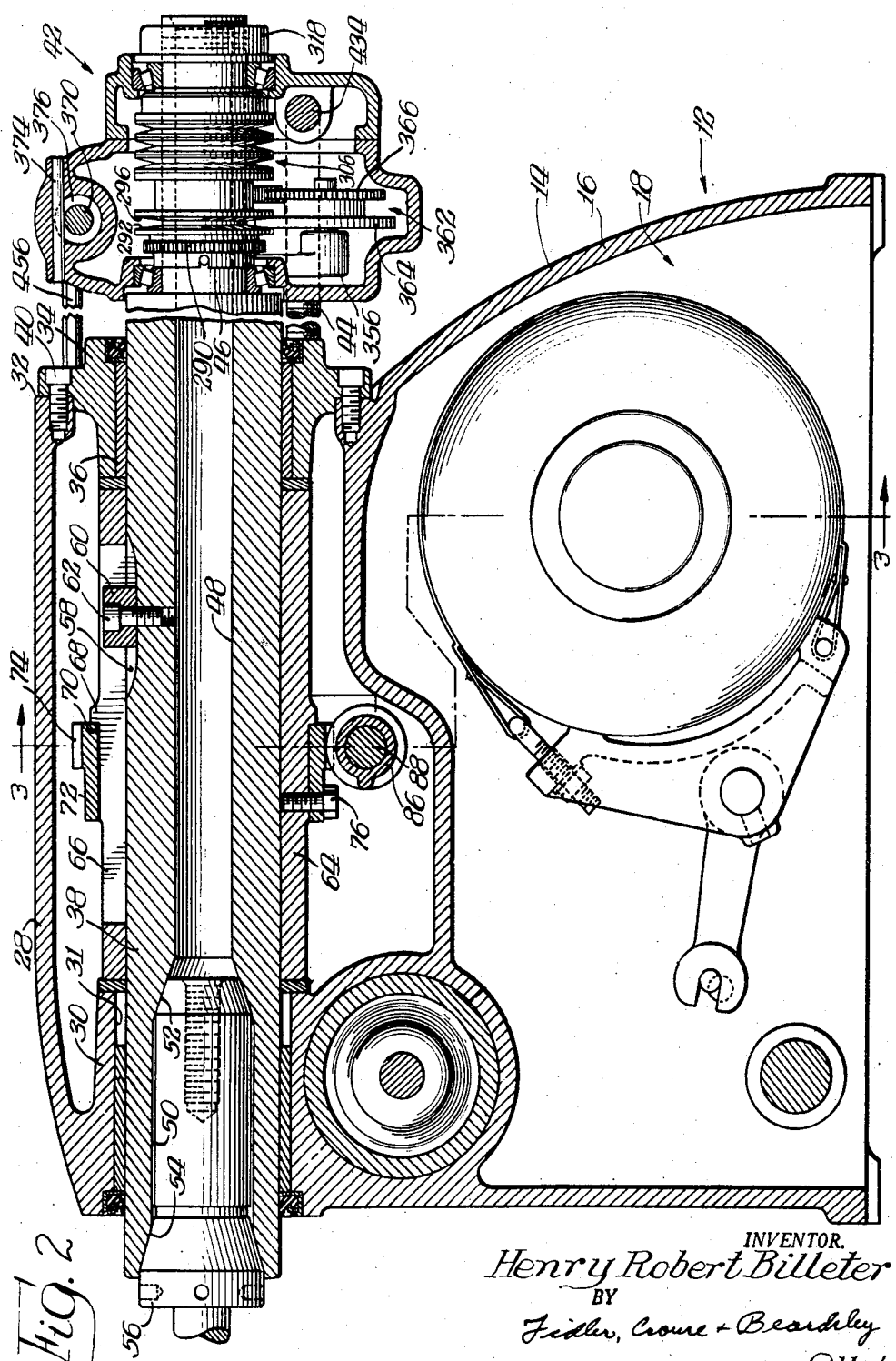

April 15, 1958 H. R. BILLETER 2,830,469
FRICTION DRIVE MEANS
Original Filed Sept. 30, 1952 5 Sheets-Sheet 3
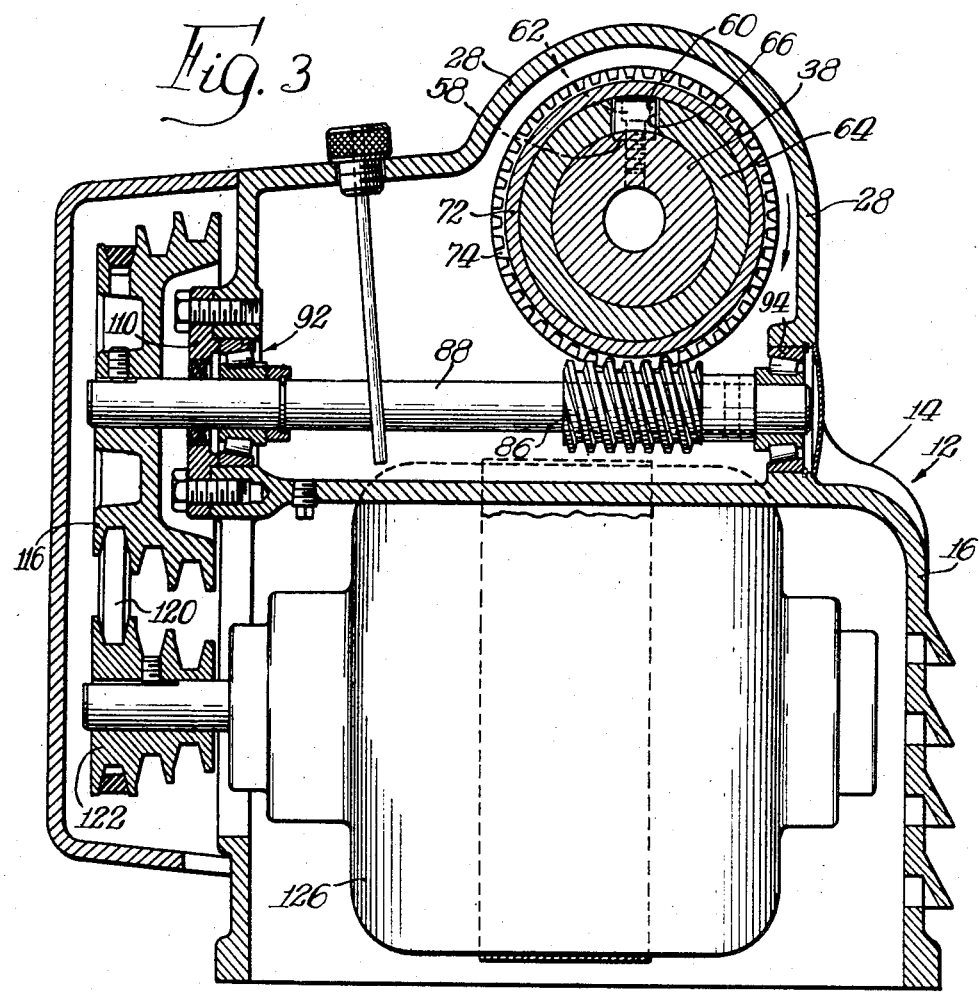
INVENTOR.
Henry Robert Billeter,
BY
Fidler, Crowe & Beardsley
Atty's.

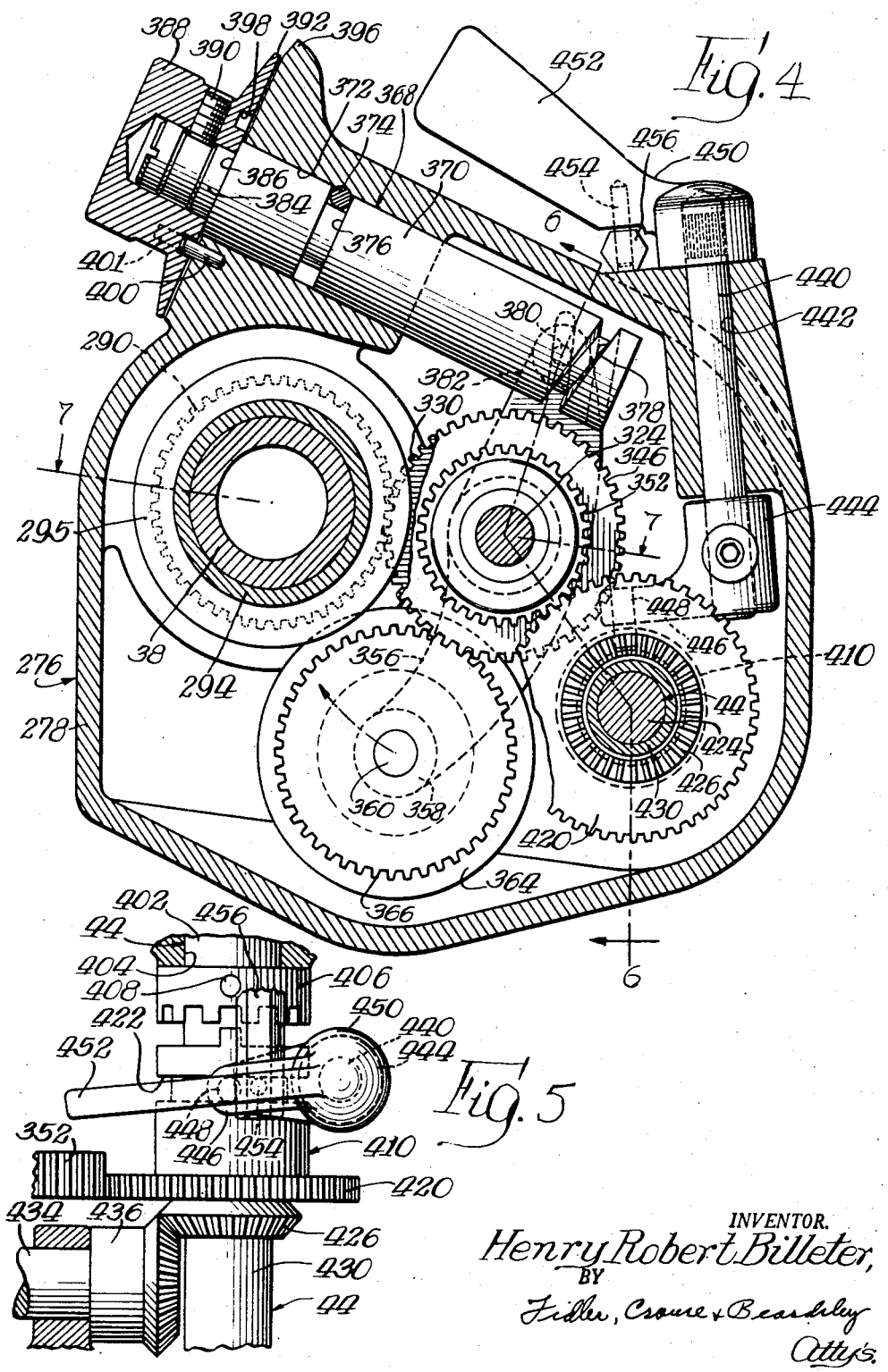

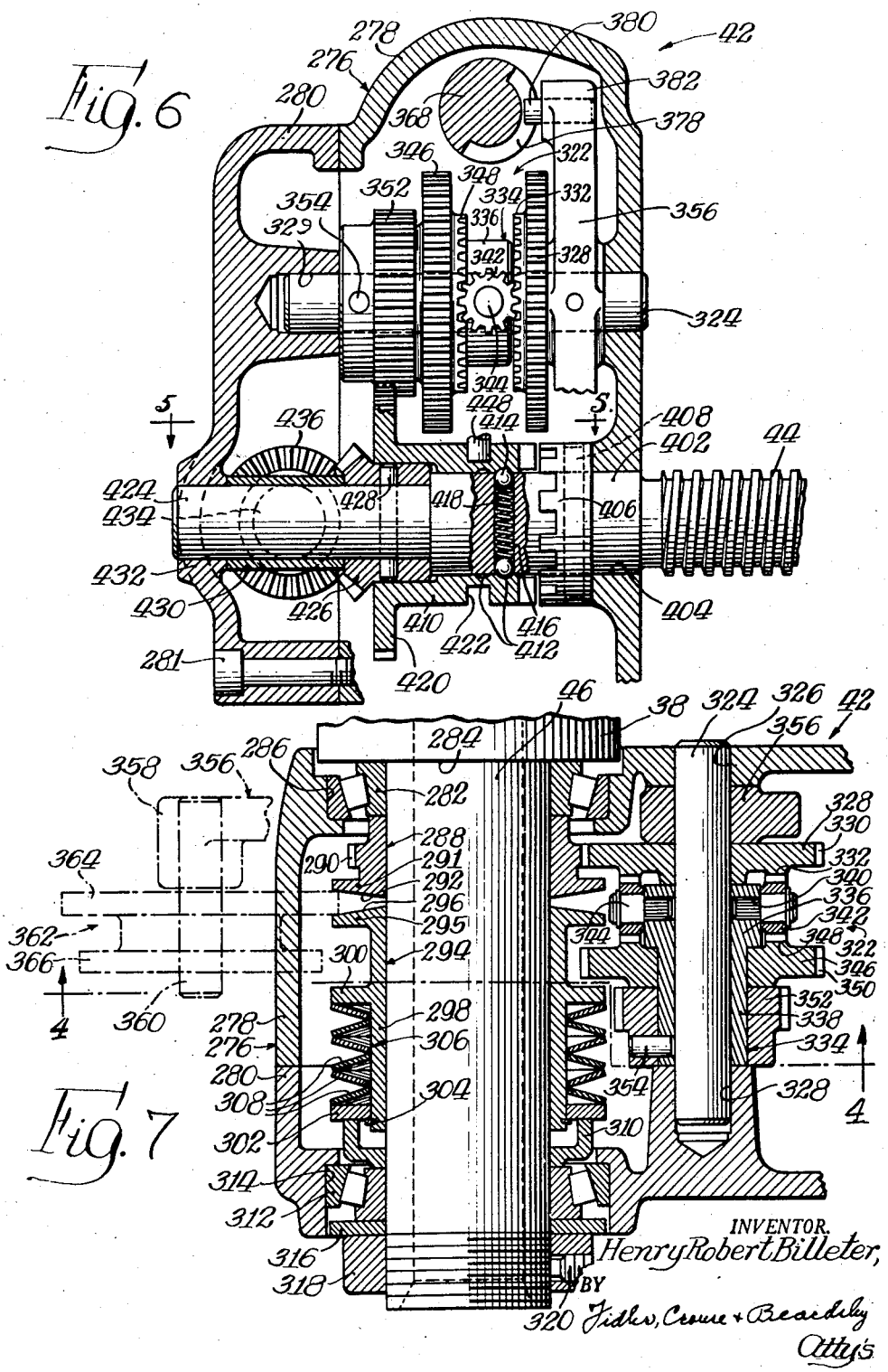

United States Patent Office 2,830,469
Patented Apr. 15, 1958

2,830,469
FRICTION DRIVE MEANS

Henry Robert Billeter, Highland Park, Ill., assignor to Ammco Tools, Inc., North Chicago, Ill., a corporation of Illinois Original application September 30, 1952, Serial No. 312,345. Divided and this application September 14, 1953, Serial No. 379,837

2 Claims. (Cl. 74—691)

This invention relates to feeding mechanisms and has to do more particularly with a power driven feeding mechanism having a continuously variable speed ratio between the input and the output elements.

An object of the present invention is to provide an improved feeding mechanism.

Another object is to provide a feeding mechanism, the speed ratio of which is continuously variable.

A further object is to provide a power transmitting mechanism of mechanical nature capable of continuously variable speed ratio between the input and output elements.

A still further object is to provide variable speed feed means capable of maintaining constant speed ratio between its input and output elements despite changes in temperature to which it is subjected.

Another object is to provide variable speed feed means having rotatable input and output shafts, in which the torque on the output shaft remains constant in all speed ratios between the shafts.

Still another object is to provide variable speed feed means having rotatable input and output shafts in which the torque on the output shaft remains constant in all speeds thereof, thereby enabling the use of safety release means operative for releasing at any predetermined setting regardless of the rate of speed of the output shaft.

A further object is to provide a mechanical variable speed feed means having an input shaft and an output shaft, utilizing differential gear drive between the input shaft and the output shaft.

Another object is to provide novel variable speed power transmitting mechanism of mechanical nature that is smooth in operation in and through all speeds within its range.

A still further object is to provide mechanical variable speed power transmitting mechanism, having an input shaft and an output shaft, and differential gearing interposed between the shafts, in which slippage means is included for controlling the differential gearing, in an arrangement in which the slippage means also provides a safety release feature, and in which spring means having a flat deflection curve is utilized for controlling the slippage means, whereby the reaction force necessary for causing slippage of the slippage means is constant for all speeds of the output shaft.

Another object is to provide mechanical variable speed power transmitting mechanism, having an input shaft and an output shaft, differential gearing between the shafts, and slippage means for controlling the differential gearing, wherein resistance encountered in the mechanism is utilized for aiding the drive of the output element.

Still another object is to provide a mechanical variable speed power transmitting mechanism having an input element and an output element, and having safety release means including mutually rotatable, interengaging friction elements arranged for slippage therebetween without misshaping or otherwise impairing the elements.

A further object is to provide novel power transmitting mechanism which by virtue of its construction is adapted to simple servicing operations.

A still further object is to provide a variable speed power transmitting mechanism of mechanical nature, including slippage means interposed between the input and output elements, in which the slippage means includes constantly rotating elements, whereby when slippage occurs, the rotating elements do not wear out of true shape or otherwise wear in such manner as to cause misshaping of the elements.

Other objects and advantages will be apparent upon reference to the following detail description taken in conjunction with the accompanying drawings, in which—

Fig. 2 is an enlarged, vertical longitudinal sectional view of the lathe of Fig. 1, taken on line 2—2 of Fig. 1;

Fig. 3 is a transverse vertical sectional view taken on line 3—3 of Fig. 1;

Fig. 4 is an enlarged transverse vertical sectional view of the feed mechanism, taken on line 4—4 of Fig. 1 and Fig. 7;

Fig. 5 is a fragmentary view of the clutch for the feed means oriented as if taken on line 5—5 of Fig. 6, and with the clutch shifter superimposed thereon;

Fig. 6 is a sectional view taken on a staggered line 6—6 of Fig. 4; and

Fig. 7 is a view taken on line 7—7 of Fig. 4 showing the driven friction disc displaced from its normal position and shown in dot-dash lines.

Figure 1:
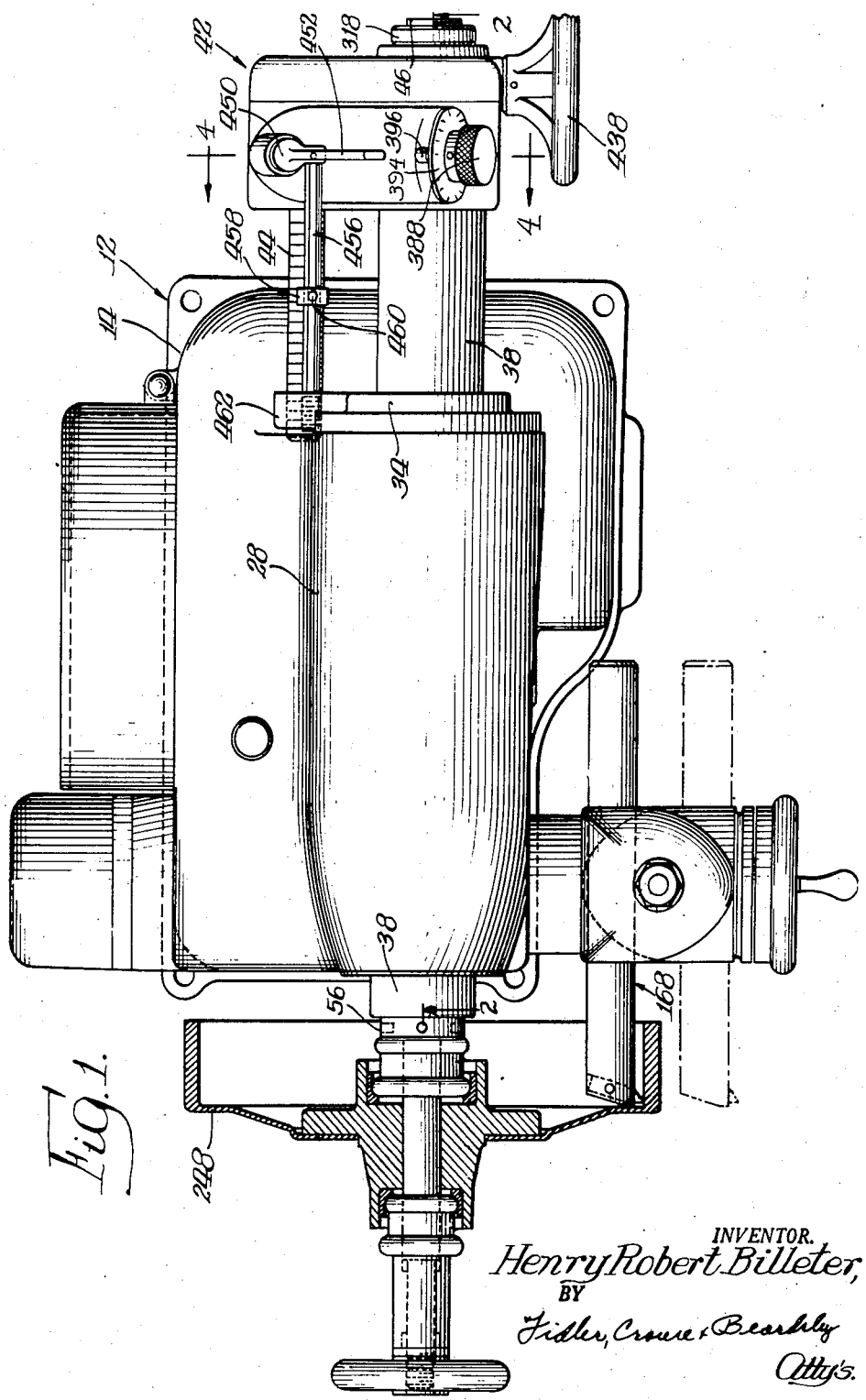
Figure 1 is a plan view of a lathe embodying the feed of the present invention.

For the purposes of illustration the feed mechanism of the present invention is described in connection with a lathe in which it may be incorporated but it will be understood that the feed mechanism is capable of more general application and the invention is not limited to application to a lathe. The lathe herein referred to is disclosed and claimed in my copending application Ser. No. 312,345, filed September 30, 1952 of which the present application is a division.

The lathe includes frame or stand 12 which is hollow and supports all of the other parts of the lathe and includes a main part 14 of generally hollow construction and having a lower skirt portion which defines a chamber 18. The upper portion 28 of the casting 14 above the transverse wall 24 is also hollow and has aligned openings, one of which is surrounded by an inturned tubular portion 30 having a bearing bore 31 and extending inwardly toward the opposite open end 32 of the portion 28. Detachably mounted on the open end 32 is a flanged bearing member 34 having a bearing 36 in axial alignment with the bearing 31, the bearings receiving and rotatably supporting a spindle 38 in a manner to be described in detail later. The flanged bearing member 34 is secured to the frame by suitable means such as screws 40.

The spindle 38 is fed axially or longitudinally in the stand so as to carry the workpiece and move it relatively to the cutting tool which is fixed in any selected setting of the lathe. The feed mechanism or means 42 of the present invention may be employed for this purpose and is supported on the spindle 38 and on a lead screw 44, the feed means 42 being actuated in response to the rotation of the spindle and the lead screw being rotated by the feed mechanism (except when the latter is disengaged therefrom as hereinafter described) and cooperating with the frame for feeding the spindle axially or longitudinally of the frame during operation.

The spindle 38 at one end has a reduced diameter portion 46 directly upon which the feed means 42 is mounted. The spindle is preferably hollow having a small diameter bore 48 terminating in an enlarged diameter portion 50. The enlarged diameter portion 50 includes an inner tapered portion 52 and an outer tapered portion 54, the two latter portions forming a double taper effect for receiving an arbor 56 for suitably mounting the workpiece. The spindle furthermore has an axial keyway 58 (Figs. 4 and 6) in its periphery for receiving a key 60 which is secured in the keyway by appropriate means such as a screw 62 extending through a hole in the key and threaded into a tapped hole in the spindle. The key 60 is thus fixed in position for cooperation with a quill 64 surrounding the spindle. The quill 64 is tubular in shape, as shown, and is so dimensioned as to have a sliding fit with the spindle. The quill is provided with a slot 66 extending through the wall thereof and extending a substantial part of the axial length of the quill for receiving the key 60 for relative sliding movement of the key in the slot in response to the axial movement of the spindle while the quill is restrained against axial or longitudinal movement. The quill provides means for imparting rotation to the spindle through the medium of engagement of the key 60 with the side wall of the slot 66, and as the spindle is rotated, the feed means 42 produces the axial or longitudinal feed movement of the spindle.

Positioned suitably on the quill 64 intermediate its ends is a circumferential rib 68 having a shoulder 70 against which is butted a ring gear 72 having worm gear teeth 74, surrounding the quill and secured thereto by suitable means such as a screw 76 inserted through a radial hole in the ring gear and threaded into a registered threaded hole in the wall of the quill.

The spindle 38 is rotated by a driving motor 126 suitably mounted in the chamber 18 and connected through a pulley 122, a belt 120 and a pulley 116 to a shaft 88 journaled in bearings 92 and 94. The shaft 88 carries and is driven by a worm 86 meshing with the teeth 74 of the gear 72.

The lathe is provided with a cutting tool 168 which is suitably mounted for adjustment into a fixed position in cutting relation with a workpiece 248 carried by the arbor 56.

The feed means 42 which also may be considered a power transmitting mechanism, and which as above indicated is capable of numerous applications, is utilized for feeding the spindle axially or longitudinally in response to rotation of the latter for carrying the workpiece longitudinally relative to the normally stationary cutting tool. The feed means is of mechanical nature and is capable of an infinite variation of speed ratio. It is also smooth in operation and is not subject to accidental variation in speed ratio such as may be caused by changes in temperature as in connection with other types of feed means, such for example as hydraulic devices. The feed, as mentioned above, is mounted on the end of the spindle and is stabilized by the lead screw 44 which has screw threaded connection with the frame of the lathe. In response to the rotation of the spindle, the lead screw 44 is rotated through its screw threaded connection with the frame, feeds the spindle axially or longitudinally. The feed means 42 includes the housing 276 made up of a main portion 278 and a cap-like smaller portion 280, the two portions having bearings and other conformations for accommodating the various operating elements of the feed means. The housing portions may be secured together by suitable means such as screws 281 appropriately spaced.

Fitted on the reduced portion 46 of the spindle is a bearing 282 (Fig. 4) which may be a well-known roller bearing butted against the shoulder 284 of the spindle and fitted in a recess 286 in the housing portion 278. Next adjacent the bearing 282 is a fixed friction disc or clutch member 288 of relatively short axial length, suitably secured as by keying or otherwise to the spindle for rotation therewith and against sliding movement thereon. The fixed disc member includes a ring gear element 290 and a disc element 291 having a generally axially facing surface 292 of frusto-conical shape of slight inclination relative to a plane transverse to the axis of the spindle. Cooperating with the friction disc 288 is a sliding friction disc or clutch member 294, axially slidable on the spindle, including a disc element 295 having a surface 296 of frusto-conical shape opposite the surface 292 and arranged so that upon sliding of the disc member 294, the two surfaces 292 and 296 move relatively toward and from each other. The disc members 288 and 294, or at least the surfaces 292 and 296 thereof, are preferably of hardened steel. The sliding disc member 294 includes a portion 298 of tubular form and of substantial axial length which is provided with a radial flange 300 spaced from the disc element 295. Surrounding the tubular portion 298 adjacent its extended end is a washer 302 retained in place by suitable means such as a split ring 304 fitted in a corresponding circumferential groove in the tubular portion. Compressed between the flange 300 and washer 302 is compression spring means 306 made up of a plurality of spring elements 308 each of annular form and normally of frusto-conical shape arranged alternately oppositely with respect to each other. The arrangement of the spring elements 308 establishes a compression curve having a substantially flat portion of considerable length and the mechanism is so designed that the spring means exerts substantially constant pressure throughout the full range of movement of the friction disc 294 in the operation of the feed means. This feature establishes a constant pressure safety release condition regardless of the degree of compression of the spring means, as will be explained more fully in detail later.

The washer 302 normally engages a spring loading cup 310 which in turn engages the inner race of a bearing 312 which may be of any suitable type and fitted in a recess 314 of the housing portion 280. Outwardly of the bearing 312 is a dust seal washer 316, while outwardly of the washer 316 is a lock nut 318 threaded on the outer end of the spindle and secured in place by suitable means such as a set screw 320.

The variable speed feed means incorporates a differential mechanism which is capable of effecting infinitely variable speed ratios, and is for that reason smooth in operation. The differential mechanism is arranged adjacent the spindle on an axis parallel therewith and includes a gearing 322 (Figs. 6 and 7) driven directly by the spindle through the medium of the ring gear 290. The differential gearing is interposed in a power train from the spindle to the lead screw 44 and is adjustably controlled by a manually manipulable means. The differential gearing 322 is mounted on a shaft 324 which may remain stationary and is mounted in bearings 326 and 329 in the housing and secured therein by any suitable means. Included in the differential gearing is a side gear 328 having spur teeth 330 in constant mesh with the ring gear 290 on the fixed disc member 288. The side gear 328 also has crown teeth 332 on one face.

Also mounted on the shaft 324 is a pinion bushing 334 having a head portion 336 and a reduced diameter sleeve portion 338, the bushing being fitted on the shaft 324 for rotation relative thereto. The head portion 336 of the pinion bushing is provided with radially extending holes 340 for mounting differential pinions or planet gears 342 thereon. The differential pinions 342 are mounted on pinion studs 344 for rotation relative thereto, the studs having outer head portions and inner knurled reduced diameter portions for frictional retention in the holes 340. The pinions 342 being freely rotatable on the studs are in mesh with the crown teeth 332 on the side gear 338. A second side gear 346 is rotatably mounted on the reduced diameter sleeve portion of the pinion bushing 338 and includes crown teeth 348 in mesh with the pinions 342, and spur teeth 350 in mesh with a control gear controlled directly by the spindle to be described later. Also, mounted on the reduced diameter portion 338 of the pinion bushing is a spur gear 352 keyed as by a pin 354 to the pinion bushing for rotation therewith. The gear 352 constitutes the output element of the power transmitting mechanism, meshing with a gear in the clutch means interposed in the gear train between the power transmitting mechanism and the lead screw 44, as will be referred to later. The differential gearing assembly just described is retained axially in position on the shaft 324 by a feed control lever 356 also mounted on the shaft 324 for rocking movement thereon.

The feed control lever 356 is shown in Figs. 2 and 4 and partially in Fig. 7. In Fig. 7 a portion of the lever and the control element mounted thereon is illustrated in displaced position for the purpose of representing the action thereof since in its normal position, it would be hidden from view in Fig. 7.

The feed control lever 356 is pivoted intermediate its ends on the shaft 324 and in one end 358 is secured a stud 360 on which is rotatably mounted a driven friction disc member 362 including a disc element proper 364 and a spur gear 366. The disc 364 and gear 366 are preferably integral. The disc member 362 or at least the disc portion 364 thereof is of hardened steel for withstanding the tendency to wear to which it is subjected. The disc 364 at its periphery extends between the disc surfaces 292 and 296 and is held in friction engagement therewith by the action of the spring means 306 in biasing the disc surfaces 292 and 296 relatively toward each other as was referred to above. The gear 366 is in constant mesh with and controls the speed of the gear 346 for controlling the rate of rotation of the output gear 352. This control is effected by positioning the disc 364 inwardly or outwardly relative to the axis of the spindle for producing various speeds of rotation of the disc relative to the spindle, as will be brought out presently.

The feed control lever 356 being pivoted on the shaft 324 which is concentric of course with the gear 346 enables the disc member 362 to be swung about the axis of the shaft while the gear 366 remains in constant mesh with the gear 346. Upon swinging the lever 356 (Fig. 4) the disc 364 is moved toward or from the axis of the spindle and in response thereto is moved radially inwardly or outwardly between the disc surfaces 292 and 296. The arrangement is that, as the discs 291 and 295 are rotated, rotation is imparted thereby to the disc 364 and under the control of the latter, the rate of rotation of the gear 346 is controlled in normal operation of the device. That is, as the disc 364 is moved closer to the axis of the spindle, the disc is rotated at a slower speed than when it is moved farther from the axis, and the speed of the gear 346 of the differential is regulated accordingly. As an example of the relationship between the various parts, the diameter of the disc 364 is substantially equal to the diameter of the periphery of the disc surfaces 292 and 296. When the periphery of the disc 364 is adjacent the outer periphery of the disc surfaces 292 and 296, there is substantially a one-to-one ratio of the speed of rotation between the respective discs. The gear 366 is equal in diameter to the gear 290 and in the condition given the two gears mentioned, 290 and 366, rotate in one-to-one ratio. Accordingly, the side gears 328 and 346 of the differential gearing rotate in opposite directions in one-to-one ratio. As a consequence, the pinion bushing 334 and gear 352 remain stationary, and since the gear 352 constitutes the output element, no rotation is imparted to the lead screw 44.

When it is desired to cause rotation of the lead screw, the feed control lever 356 is swung or rocked, as hereinafter explained, for moving the disc 364 from the position assumed radially inwardly relative to the axis of the spindle. This movement forces the disc 364 radially inwardly of the disc surfaces 292 and 296, the spring means 306 being compressed enabling the disc surfaces to be spread accordingly. As the disc 364 is moved radially inwardly, its speed of rotation relative to the spindle is reduced. The slower speed of rotation of the disc 364 and consequently of the gear 366 reduces the speed of rotation of the side gear 346 below that of the side gear 328; as a consequence, the bushing 334 and output gear 352 are rotated slowly in accordance with the differential in speed between the gears 346 and 328.

The above description of the operation of the feed means has to do with that condition wherein the lead screw is first at rest and then rotation is imparted thereto; however a similar operation is performed for varying the speed of rotation of the lead screw from a given speed of rotation, i. e., the disc-gear member 362 is moved toward or from the axis of the spindle, moving it toward the axis causing the lead screw to rotate at a greater speed, and from the axis, at a slower speed.

The feed means thus provides a wide range of speed ratios between the input and output elements. The output element can be regulated to zero rotation, and by providing the desired gear train between the output element and the lead screw, as wide a range of speed ratios as desired may thus be provided between the input element and lead screw. However, in the present instance, in view of the nature of the device to which the feed means is applied, it is desired that the lead screw be rotated at a relatively low rate of speed.

The feed means enables a continuous variation of speed ratios, with consequent fine control of the speed of rotation of the output element, which in a mechanical mechanism has numerous advantages. The operation is extremely smooth, there are no step-by-step changes and an inherent safety feature is present in that slippage is provided for between the disc 364 and the disc surfaces 292 and 296. If any driven element in the feed means beyond and controlled by the discs should become blocked, slippage will occur between the discs with the result that no breakage of any of the parts can result. For example, if the lead screw should become blocked and restrained against rotation, the pinion bushing 334 would remain stationary and the pinions would rotate in place. The side gear 328 would then produce rotation of the other side gear 346 at the same speed, and the disc 364 would rotate at a speed greater than the peripheral speed of that portion of the disc surfaces 292 and 296 then engaged by the disc 364.

Another important feature of the present invention is that if and when slippage occurs, none of the parts are worn objectionably in such a manner as to render any of the parts inaccurate from the standpoint of operation. The slippage that occurs between the disc 364 and disc surfaces 292 and 296 produces simply a polishing action since all of the elements remain in constant rotation, and no "flats" or other objectionable misshaped conformations are developed.

Because of the virtually constant pressure exerted by the spring means 306 throughout the range of relative movement of the sliding friction disc 294, the safety feature is of constant magnitude regardless of the setting of the mechanism; e. g., any resistance encountered is imparted through the differential gearing to the disc 364 and the reactive force counter to the resistance, as imposed by the spring means 306 is constant. Therefore, regardless of the setting of the disc 364 radially of the disc surfaces 292 and 296, slippage will occur at the same predetermined resistance encountered.

An additional important feature of the feed means is that resistance encountered aids in driving the lead screw rather than hindering it. For example resistance that operates to impede rotation of the gear 346 and reduce its speed of rotation, relative to the gear 328, aids in driving the lead screw in the manner mentioned. Such variation in the differential in speed between the gears 328 and 348 produces rotation of the pinion bushing 334 and gear 352, or increases the speed of rotation thereof, depending upon the previous condition as to rotation of the bushing, in the manner described above in connection with the operation of the feed means.

The torque produced on the output element is constant regardless of the speed of rotation thereof. The forces applied are exerted through gears 290 and 328, and the pinions 342, and since these remain in constant radially placed positions, the torque imposed is constant throughout the speed range. This is considered to be an important advantage particularly in the case of a mechanical variable speed mechanism. The constant torque feature is important in the use of a safety release means. It is desired that safety release means yield at a definite predetermined point, and in the case of constant torque, it yields at that point in all conditions of operation. A decided advantage will be seen in this arrangement, as compared with variable torque, safety release means set to release at high torque will not release properly at low torque, and vice versa.

The speed of rotation of the output element will remain constant according to the setting of the mechanism regardless of any changes of temperatures, which also is an important advantage and overcomes an objection in this respect encountered in the case of hydraulic equipment.

The adjustable setting of the feed means for producing the desired speed ratio is accomplished by means of a feed adjusting screw 368 (Figs. 4 and 5) which includes a shaft 370 rotatably mounted in a bearing 372 formed in the housing portion 278. The shaft 370 is restrained against longitudinal movement by means of a pin 374 fitted in a transverse opening in the housing and positioned in a circumferential groove 376 in the shaft. The inner end of the shaft 370 is provided with a helical groove 378 of appropriate lineal length in which is received a pin 380 secured in the end 382 of the feed control lever 356 opposite the end 358 in which the disc member 362 is mounted. Upon rotation of the shaft 370 the pin 380 follows the helical groove and produces the desired swinging movement of the feed control lever 358 for moving the disc 364 toward and from the axis of the spindle in the manner and for the purpose described above.

The outer end of the shaft 370 projects out of the bore 372 where it has a reduced diameter portion 384 forming a shoulder 386. A dial 388 of suitable construction is fitted on the reduced end portion of the shaft in abutment with the shoulder 386 and secured on the shaft by suitable means such as a set screw 390. The dial 388 includes a flanged portion 392 on which are provided suitable indicia markings 394 (Fig. 1) cooperable with a suitable indicator mark on a projection 396 on the housing adjacent the periphery of the dial. The inner surface of the dial is provided with a circumferential groove 398 in which is received a stop pin 400 secured in the housing and projecting therefrom. Another pin 401 fitted in a hole in the dial extends into the groove for engagement with the stop pin 400 for limiting the extent of rotation of the dial in both directions. Upon loosening the set screw 390, the dial may be adjusted to the desired setting relative to the shaft after which the set screw is tightened, enabling the dial to be set to properly indicate the setting of the feed means.

The remaining portion of the drive in the feed means 42 between the mechanism described above and the lead screw 44 is shown in Figs. 4, 5 and 6. The lead screw 44 has an unthreaded shaft portion 402 mounted in a bearing 404 of the housing and extends parallel with the axes of the shaft 324 and spindle. Inwardly of the bearing 404 a jaw clutch element 406 is mounted on the shaft portion 402 and secured thereto by suitable means such as, for example, a pin 408.

Cooperating with the jaw clutch element 406 is a sliding jaw clutch element 410 mounted on the shaft portion 402 for rotation relative thereto and limited sliding movement thereon between clutching and declutching positions. The inner surface of the clutch element 410 is provided with axially spaced circumferential grooves 412 adapted for alternately receiving balls 414 fitted in a diametrical bore 416 in the shaft and biased outwardly by a compression spring 418. The spring normally retains the balls in the groove which is in register therewith and upon shifting the clutch element in the opposite direction, the balls are pressed inwardly and allowed to enter into the other groove. The arrangement normally retains the clutch in its set position and retains it in such a position in the absence of pressure applied for the purpose of shifting the clutch element.

The clutch element 410 is provided with a gear 420 which is in constant mesh with the output gear 352 of the feed means, referred to above and controlled by the differential gearing 322. The gear 420 is of lesser axial extent than the gear 352 to enable the sliding movement of the gear 420 relative to the gear 352 in response to shifting of the clutch element, whereby the gears remain constantly in mesh. The clutch element 410 is provided with a circumferential groove 422 for receiving an element of the clutch shifter as will be referred to later.

The shaft portion 402 is provided with a reduced diameter extremity 424 on which is fitted a miter gear secured thereto as by a diametrical pin 428, the hub portion of the gear being suitably received in a recess of the clutch element 410. A spacer bushing 430 is interposed between the miter gear 426 and the bearing portion 432 in the housing in which the extreme end portion of the shaft is supported.

Manual means is provided for rotating the lead screw 44 which includes a shaft 434 suitably supported in bearings in the housing and disposed transversely to the lead screw 44. On the inner end of the shaft 434 is fixed a miter gear 436 in mesh with the miter gear 426, while the opposite end of the shaft which projects out of the housing is provided with a handwheel 438 for manual rotation of the shaft and consequent rotation of the lead screw 44. The handwheel 438 may be utilized when the clutch 406, 410 is declutched for adjusting the spindle longitudinally to initially set the workpiece according to the setting of the cutting tool. When, however, the clutch is in clutched condition the lead screw is operated by the spindle through the feed means, and the spindle is fed longitudinally in response to its rotation and at a rate according to the setting of the feed means.

The means for clutching and declutching the clutch is arranged for automatically declutching it when the cutting operation is completed. The means is in the form of a clutch shifter having a shaft 440 (Fig. 4) suitably mounted in a bore 442 and preferably positioned near the vertical. On the inner or lower end is a clutch shifter 444 having a laterally extending leg 446 in the end of which is mounted a pin 448 extending into the groove 422 in the sliding clutch element 410. On the outer or upper end of the shaft 420 is a handle 450 suitably secured to the shaft as by a knurled arrangement or other convenient means. The handle has a manipulable portion 452 arranged for convenient grasping by the hand and in the under surface of the handle is a hole receiving a pin 454, the other end of which is inserted in a hole in a rod 456. The rod 456 is supported at one end on the housing of the feed means and its other end extends through an opening in the flanged portion of the member 34 on the frame of the lathe. Adjustably slidably mounted on the rod 456 is a collar 458 provided with a set screw 460 arranged so that the collar may be slid along the rod and fixedly set in any adjusted position. The lead screw 44 has threaded engagement in a threaded hole in the member 34, at any convenient place therein, such as in a projection 462 formed on the member.

The clutch 406, 410 may be clutched and declutched manually by manipulation of the clutch shifter handle 452 in response to which the leg 446 on the clutch shifter swings and thereby shifts the clutch element 410 into and out of engagement with the clutch element 406. The automatic declutching feature is provided by contact engagement of the collar 458 with the frame of the lathe. In setting up the lathe for a lathing operation the workpiece 250 is mounted on the spindle, and the spindle is run out to a position wherein the workpiece is disposed axially beyond the cutting tool, this operation being performed by means of actuation of the handwheel 438 while the clutch in the feed means is declutched. This position is that in which the declutching operation is to be accomplished when an automatic operation is performed. With the parts set according to the above, the collar 458 is slid along the rod 456 to the position wherein it engages the frame of the lathe. The set screw 460 is then tightened and the collar remains in fixed position. The spindle is then run back to the position desired for starting the cutting operation (as in Fig. 1), whereupon the clutch is shifted to clutched position manually by manipulating the handle 452. The lathe may then be set in operation and in response to the location of the spindle, the latter is fed axially or longitudinally (to the left of Fig. 1) by means of the feed means 42. The movement of the feed means causes the rod 456 to be slid with it, through the medium of the shifter handle 452. Upon engagement of the collar 458 with the frame of the lathe, movement of the rod 456 is checked and continued movement of the feed means relative to the rod causes the rod to swing the clutch handle 452 and shift the clutch to declutched position. Thereafter any continued rotation of the spindle in ineffective for producing a longitudinal feed movement thereof. The machine may then be shut off and the workpiece dismounted therefrom.

From the foregoing it will be seen that the feed mechanism of the present invention is capable of wide application where it is desired to provide for a continuous variation in the speed ratio between a driving shaft and a driven shaft.

I claim:

1. Friction drive means for cooperation with a power input shaft and gear, and a power output shaft and gear radially displaced therefrom, comprising a pair of peripherally engaging friction disc members, and differential gear means including a pair of main gears, a plurality of planetary gears, each meshing with both of said main gears, a planetary gear carrier, and a differential gear shaft rotatably supporting said main gears and said carrier and radially displaced from said input and output shafts, said carrier supporting said planetary gears for rotation about their axes and for rotary movement about said differential gear shaft, one of said main gears meshing with said power input gear, one of said friction disc members being secured to said power input shaft, the other of said friction disc members being mounted on a fourth shaft and frictionally engaging said one friction disc member, a gear drivingly connected to said other friction disc member and meshing with the other of said main gears, said carrier including a sleeve rotatable on said differential gear shaft and extending through and beyond one of said main gears, said last mentioned main gear being rotatable on said sleeve, and a gear secured to the free end of said sleeve and meshing with the power output gear, said fourth shaft being mounted for pivotal movement about said differential gear shaft whereby said friction discs may be moved relatively toward and away from each other.

2. The friction drive means of claim 1 wherein said one friction disc member comprises two elements having facing surfaces sloping radially outwardly away from each other and receiving the periphery of said other friction disc member therebetween, one of said elements being rigidly secured to said power input shaft and the other of said elements being slidable thereon, and spring means uring said other element toward said one element.

References Cited in the file of this patent

UNITED STATES PATENTS

| | | |
|---|---|---|
| 917,463 | Larsen | Apr. 6, 1909 |
| 1,455,093 | Roebuck | May 15, 1923 |
| 1,713,873 | Jeune | May 21, 1929 |
| 1,730,797 | Zoller et al. | Oct. 8, 1929 |
| 2,233,967 | Wellton | Mar. 4, 1941 |
| 2,395,586 | Scott | Oct. 7, 1942 |
| 2,583,496 | Rougelot | Jan. 22, 1952 |
| 2,659,245 | McLaren | Nov. 17, 1953 |

FOREIGN PATENTS

| | | |
|---|---|---|
| 730,233 | France | Aug. 9, 1932 |